(12) United States Patent
Ishii

(10) Patent No.: US 9,019,543 B2
(45) Date of Patent: Apr. 28, 2015

(54) IMAGE PROCESSING SYSTEM AND DISPLAY CONTROL METHOD

(71) Applicant: Yukinori Ishii, Kanagawa (JP)

(72) Inventor: Yukinori Ishii, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/168,126

(22) Filed: Jan. 30, 2014

(65) Prior Publication Data

US 2014/0211257 A1      Jul. 31, 2014

(30) Foreign Application Priority Data

Jan. 31, 2013    (JP) .................................. 2013-016960

(51) Int. Cl.
| | | |
|---|---|---|
| *G06F 3/12* | (2006.01) | |
| *G06K 15/00* | (2006.01) | |
| *G03G 15/00* | (2006.01) | |
| *H04N 1/32* | (2006.01) | |

(52) U.S. Cl.
CPC .......... *G06F 3/1292* (2013.01); *H04N 1/32539* (2013.01); *G06F 3/1226* (2013.01); *G06F 3/1204* (2013.01)

(58) Field of Classification Search
USPC ............................................... 399/81, 82, 87
See application file for complete search history.

(56) References Cited

U.S. PATENT DOCUMENTS

| | | | | |
|---|---|---|---|---|
| 7,808,658 | B2 * | 10/2010 | Hashimoto et al. ............ | 358/1.1 |
| 7,916,329 | B2 * | 3/2011 | Iizuka et al. .................. | 358/1.15 |
| 8,285,168 | B2 * | 10/2012 | Ikeda ............................... | 399/81 |
| 8,390,837 | B2 * | 3/2013 | Morooka ..................... | 358/1.14 |
| 2007/0223068 | A1 | 9/2007 | Ishii et al. | |
| 2011/0228305 | A1 * | 9/2011 | Sasase .......................... | 358/1.13 |
| 2013/0135652 | A1 * | 5/2013 | Kobayashi ................... | 358/1.13 |

FOREIGN PATENT DOCUMENTS

| | | |
|---|---|---|
| JP | 2003-241940 | 8/2003 |
| JP | 2009-037591 | 2/2009 |

* cited by examiner

*Primary Examiner* — Satwant Singh
(74) *Attorney, Agent, or Firm* — Oblon, McClelland, Maier & Neustadt, L.L.P.

(57) ABSTRACT

An operation device receives information indicating an image processing job to be executed according to specific image processing settings and sends an execution check request to each one of a plurality of image processing apparatuses. The operation device displays, at a display, one or more image processing apparatuses capable of executing and currently available to perform the image processing job according to the specific image processing settings, based on responses respectively received from the plurality of image processing apparatuses.

15 Claims, 8 Drawing Sheets

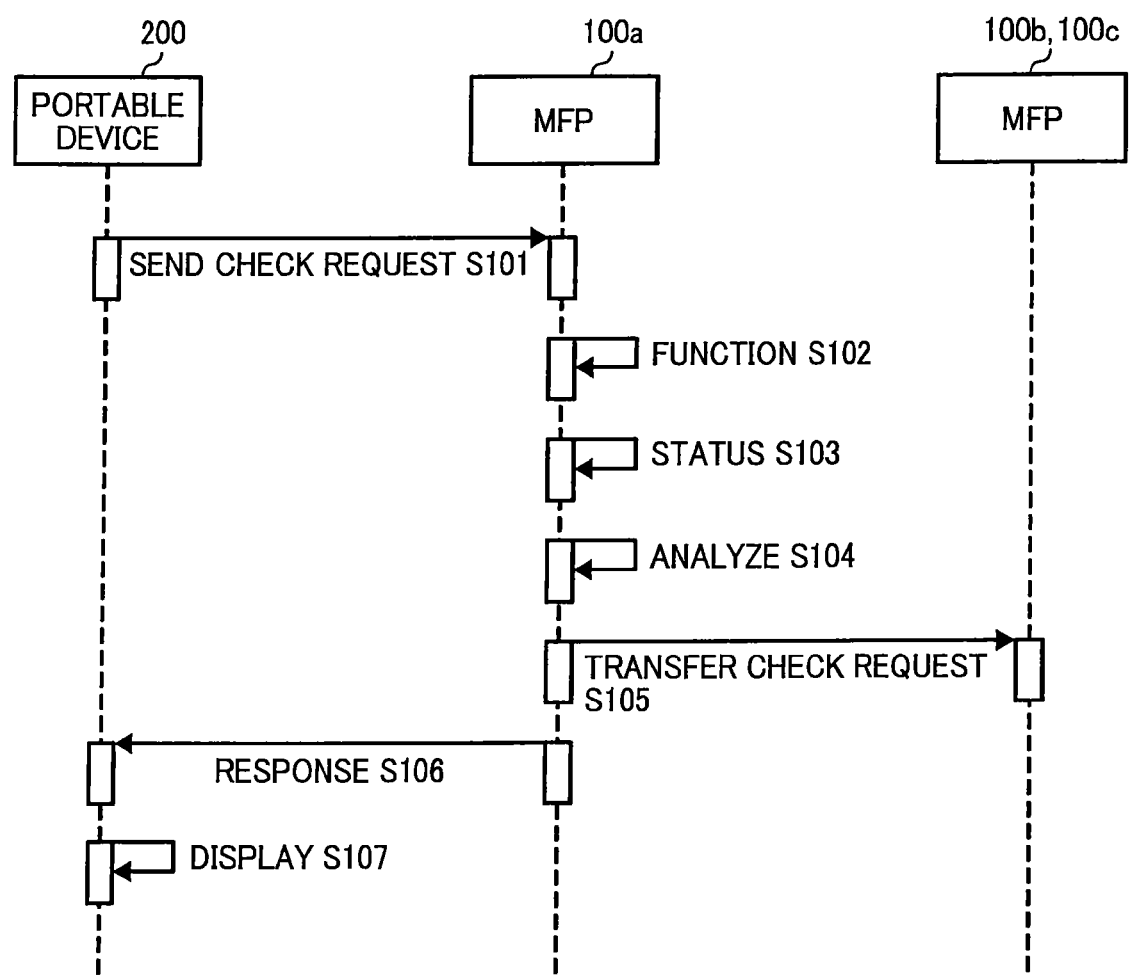

FIG. 5D

| CHECK BEFORE JOB EXECUTION | |
|---|---|
| 306—CONNECTABLE | |
| AVAILABLE | STATUS |
| 100b | 🖵—303 |
| | |
| | |

FIG. 5E

| OTHER | STATUS |
|---|---|
| 100b | 🖵 |

FIG. 5F

100c: AVAILABLE
WAITING FOR JOB

| ID | CAPABILITY | AVAILABILITY | ATTRIBUTE | STATUS |
|---|---|---|---|---|
| 100a | N | — | 100b | OTHER MFP |
| 100b | Y | Y | — | EXECUTABLE |
| 100c | Y | N | 1 min. | EXECUTING |

IMAGE PROCESSING SYSTEM AND DISPLAY CONTROL METHOD

CROSS-REFERENCE TO RELATED APPLICATIONS

This patent application is based on and claims priority pursuant to 35 U.S.C. §119 to Japanese Patent Application No. 2013-016960, filed on Jan. 31, 2013, in the Japan Patent Office, the entire disclosure of which is hereby incorporated by reference herein.

BACKGROUND

1. Technical Field

The present invention relates to an image processing system including an image processing apparatus and an operation device, and a method of controlling display of information regarding the image processing apparatus through the operation device.

2. Description of the Related Art

The mobile terminal may be used to remotely operate an image processing apparatus. The mobile terminal searches an image processing apparatus that is communicable with the mobile terminal, and sends a job request to the searched image processing apparatus to instruct the image processing apparatus to perform the job. However, the searched image processing apparatus, which is communicable with the mobile terminal, is not always capable of executing the job as requested by the mobile terminal. For example, even when the mobile terminal sends a print request to perform post-processing such as stapling, to the image processing apparatus that is found to be communicable with the mobile terminal, the mobile terminal may receive an error from the image processing apparatus, indicating that the stapling function is not provided.

SUMMARY

Example embodiments of the present invention include an operation device, an image processing system including the operation device and a plurality of image processing apparatuses, a display control method performed by the operation device, and a display control program stored in a non-transitory recording medium. The operation device receives information indicating an image processing job to be executed according to specific image processing settings, and sends an execution check request to each one of the plurality of image processing apparatuses each configured to communicate with the operation device via a network. In response to the execution check request, the operation device receives from each one of the plurality of image processing apparatuses, a response including a determination result indicating whether the image processing apparatus is capable of executing and currently available to perform the image processing job according to the specific image processing settings, the determination result being generated based on function information of the image processing apparatus, status information of the image processing apparatus, and the information regarding the specific image processing settings. The operation device displays, at a display, one or more image processing apparatuses capable of executing and currently available to perform the image processing job according to the specific image processing settings, based on the responses respectively received from the plurality of image processing apparatuses configured to communicate with the operation device via the network.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 4A is a data sequence diagram illustrating operation of displaying information regarding one or more image processing apparatuses, performed by the image processing system of FIG. 1, according to an example embodiment of the present invention;

FIGS. 5A to 5F are example screens displayed at the portable device of FIG. 1, which communicates with one or more image processing apparatuses of the image processing system of FIG. 1;

Figure 1:
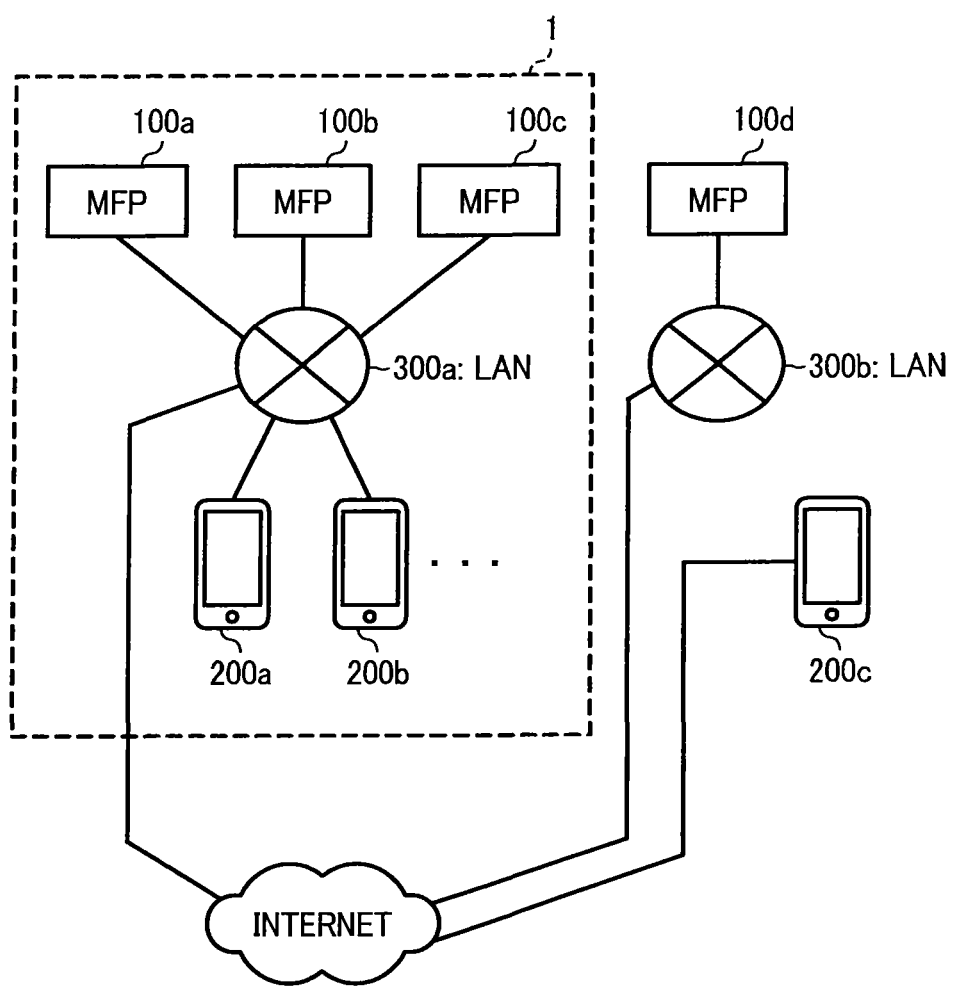
FIG. 1 is a network configuration of an image processing system according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity.

However, the present disclosure is not intended to be limited to the specific terminology so selected and it is to be understood that each specific element includes all technical equivalents that operate in a similar manner.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

FIG. 1 illustrates a network configuration of an image processing system 1 according to an example embodiment of the present invention. The image processing system 1 of FIG. 1 includes a plurality of image processing apparatuses 100a, 100b, and 100c (collectively referred to as the image processing apparatus 100), which are provided on a local area network (LAN) 300a such that the image processing apparatuses 100 communicate with one another using the Internet protocol. In this example, a portable operation device 200a or a portable operation device 200b (collectively or each referred to as the portable device 200) may be connected to the LAN 300a, for example, through a wireless network such as WiFi. The portable device 200 may send a request to any image processing apparatus 100 to perform image processing using the image processing apparatus 100.

More specifically, in the following embodiment, before sending a request to execute image processing, the portable device 200 searches one or more image processing apparatuses 100 communicable with the portable device 200, determines which one of the image processing apparatuses 100 is capable of performing and currently available to perform a job to be requested, and displays information regarding at least one communicable image processing apparatus 100 that is capable of currently executing a job. For example, the portable device 200 determines at least one image processing apparatus 100 capable of performing a job and currently is available, based on capability information indicating an available function, and status information indicating a current status of the information processing apparatus 100.

In this example, the image processing apparatus 100 is implemented by a multifunctional peripheral (MFP) capable of performing a plurality of image processing functions such as the copy function, print function, facsimile data communication function, or data communication function. The portable device 200 may be implemented by a portable phone, smart phone, personal digital assistant (PDA), tablet personal computer, or notebook personal computer.

The LAN 300a may be connected to the other network through the Internet. In this example illustrated in FIG. 1, a portable device 200c is connected to the Internet via the network other than the LAN 300a, such that it is not recognized as a local device on the LAN 300a. An image processing apparatus 100d is provided on a LAN 300b, which is different from the LAN 300a, such that it is also not recognized as a local device on the LAN 300a. None of the portable device 200c and the image processing apparatus 100d is recognized as the local device on the LAN 300a, so that when the portable device 200a or 200b searches for the image processing apparatus 100 communicable, the image processing apparatus 100d is not searched. In a similar manner, when the portable device 200c searches for the image processing apparatus 100 communicable, the image processing apparatuses 100a, 100b, and 100c are not searched.

Figure 2A:
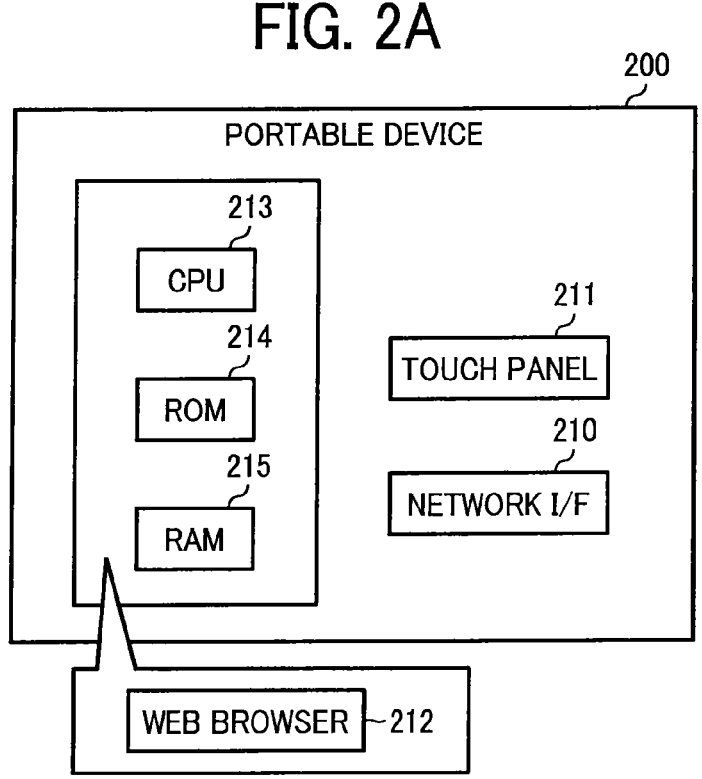
FIG. 2A is a schematic block diagram illustrating a structure of a portable operation device ("portable device") of the image processing system of FIG. 1, according to an example embodiment of the present invention.

FIG. 2A illustrates a hardware structure of the portable device 200. The portable device 200 includes a network interface (I/F) 210, a touch panel 211, a central processing unit (CPU) 213, a read only memory (ROM) 214, and a random access memory (RAM) 215, which are connected to each other via a bus. The portable device 200 is installed with various application programs such as a web browser 212.

The network interface 210 may be implemented by hardware that connects the portable device 200 with the LAN 300 for communication, or a combination of hardware and software in compliance with a predetermined communications protocol. The touch panel 211 displays an image generated by the web browser 212, or receives a user input regarding operation to be performed by the portable device 200. Through the touch panel 211, the user can easily drag an image or enlarge the image being displayed on the touch panel 211.

The CPU 213 controls entire operation of the portable device 200. The ROM 214 stores various programs such as an operating system (OS) and application programs, and system data to be used for the OS. The RAM 215 functions as a work area for the CPU 213.

The web browser 212, which operates under control of the CPU 213, displays a screen on the touch panel 211 based on hypertext data, which is transmitted from the image processing apparatus 100 using HTTP.

Figure 2B:
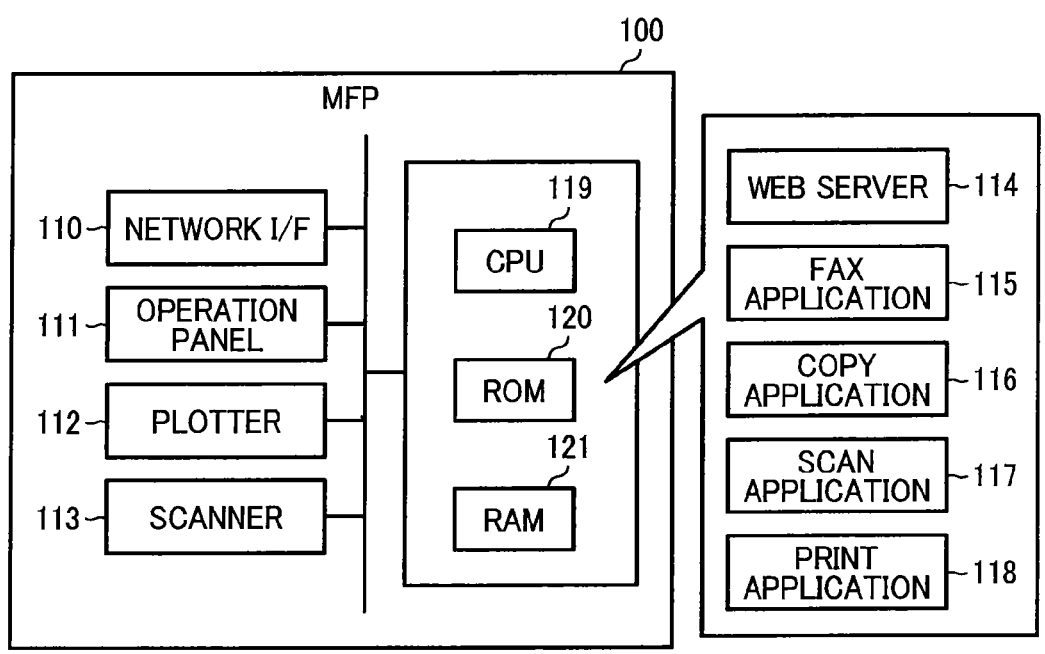
FIG. 2B is a schematic block diagram illustrating an image processing apparatus of the image processing system of FIG. 1, according to an example embodiment of the present invention.

FIG. 2B illustrates a hardware structure of the image processing apparatus 100, which is a MFP 100. The MFP 100 includes a network interface (I/F) 110, an operation panel 111, a plotter 112, a scanner 113, a CPU 119, a ROM 120, and a RAM 121. The MFP 100 may further include a system manager that manages a status of a system on the MFP 100, a memory manager that manages a memory of the MFP 100 such as an imaging memory that may be provided by the RAM 121, an engine manger that manages the plotter 112 and the scanner 113, and a user data manager that manages user-specific data such as authentication data to be used for authenticating a user or user address data to be used for identifying a destination to which data is transmitted.

The MFP 100 is installed with a web server 114, and at least one of image processing applications such as facsimile (fax) application 115, copy application 116, scan application 117, and print application 118.

The network interface 110 may be implemented by hardware that connects the MFP 100 with the LAN 300 for communication, or a combination of hardware and software in compliance with a predetermined communications protocol.

The operation panel 111 functions as an input/output device. For example, the operation panel 111 includes an output device such as a liquid crystal display (LCD) that displays a screen, and/or a LED and a buzzer that notifies the status of the MFP 100. The operation panel 111 further includes a touch panel integrated on the LCD, and a number of hard keys that allow the user to input or select a user instruction.

The plotter 112 includes various image forming devices, which form an image on a recording sheet using any desired image forming method such as inkjet or electrophotographic method. The plotter 112 may include devices to perform post-processing such as stapling or booking.

The scanner 113 reads an original image into image data, by scanning the original image, and converts the scanned data into an image signal for further processing such as image forming or storage into a memory of the MFP 100. The scanner 113 may additionally include an auto document feeder (ADF), which feeds an original document one sheet by one sheet to an image reading position where the original image is read by the scanner 113.

The CPU 119 controls entire operation of the MFP 100. The ROM 120 stores various programs such as an operating system (OS) and application programs, and system data to be used for the OS. The RAM 121 functions as a work area for the CPU 119.

The web server 114, which operates under control of the CPU 119, communicates with a web browser such as the web browser 212 of the portable device 200 to provide the server function to the web browser. More specifically, the web server 114 analyzes a request received from the web browser 212 through the LAN 300a such as a uniform resource locator (URL), and instructs the lower module to perform processing according to the request. The web server 114 receives a processing result from the lower module, and sends a response including the processing result to the web browser 212 in HTTP. The lower module may be any one of the fax application 115, copy application 116, scan application 117, and print application 118, each of which is capable of performing a job according to a user instruction.

The fax application 115 performs operation of transmitting or receiving facsimile data using hardware such as the network interface 110, the scanner 113, any desired memory such as the RAM 121, or the plotter 112. The copy application 116 performs operation of copying an original image using hardware such as the scanner 113, any desired memory such as the RAM 121, or the plotter 112. The scan application 117 performs operation of scanning an original image into image data using hardware such as the scanner 113, or any desired memory such as the RAM 121. The print application 118 performs operation of printing image data onto a recording sheet using hardware such as the network interface 110, any desired memory such as the RAM 121, or the plotter 112.

While the MFP 100 is capable of performing any one of the above-described jobs according to a user instruction input through the operation panel 111, in the following embodiment, it is assumed that the MFP 100 performs any one of the above-described jobs according to a user instruction input through the portable device 200.

As mentioned above, the user may instruct any one of the MFPs 100a to 100c on the LAN 300a to perform a job, through the portable device 200. Further, in most cases, the user does not know which one of the MFPs 100a to 100c is capable of performing the job as requested by the user. In view of this, the portable device 200 is provided with the function of transmitting a request to each one of the MFPs 100a to 100c that is communicable through the LAN 300a, which requests to determine whether the MFP 100 is provided with a specific function to perform the job instructed by the user. The MFP 100, which receives such request, sends a response indicating whether the MFP 100 is provided with the specific function to perform the job. Based on the responses received from the MFPs 100a to 100c, the portable device 200 displays information indicating which one of the MFPs 100a to 100c is capable of performing the job.

The portable device 202 may further transmit a request to each one of the MFPs 100a to 100c that is communicable via the LAN 300a, which requests to determine whether the MFP 100 is currently available to perform the job using the specific function. The MFP 100, which receives such request, sends a response indicating whether the MFP 100 is currently available to perform the job using the specific function. In case the MFP 100 is not currently available, for example, as the MFP 100 is currently performing a job instructed by the other operation device, the MFP 100 may include information indicating an estimated time at which the job is completed. Based on the responses received from the MFPs 100a to 100c, the portable device 200 displays information indicating whether which one of the MFPs 100a to 100c is currently available to perform the job. The portable device 200 may additionally display information regarding completion of a currently-performed job.

Further, in case the MFP 100 determines that the MFP 100 is not provided with the specific function to perform the job, the MFP 100 may transfer the request received from the portable device 200 to the other MFP 100, which is determined to be a peripheral device. In this example, the MFP 100 is determined to be a peripheral device, when the MFP 100 has an IP address that is the same as that of the MFP 100 transferring the request, except for the lowest 1 byte in case the IP ver. 4 is used. Alternatively, any other way of determining the peripheral device may be used, as long as it is related to the location of the MFP 100. The MFP 100 receives a response from the peripheral MFP 100, which indicates whether the peripheral MFP 100 is capable of currently executing the job, in response to the request. Based on the response received from the MFP 100 that has transferred the request, the portable device 200 may display information regarding the other MFP 100 that is capable of performing the job.

Any one of the above-described processing is performed by the portable device 200 in cooperation with the MFP 100, in prior to sending the job execution request to the MFP 100.

Figure 3:
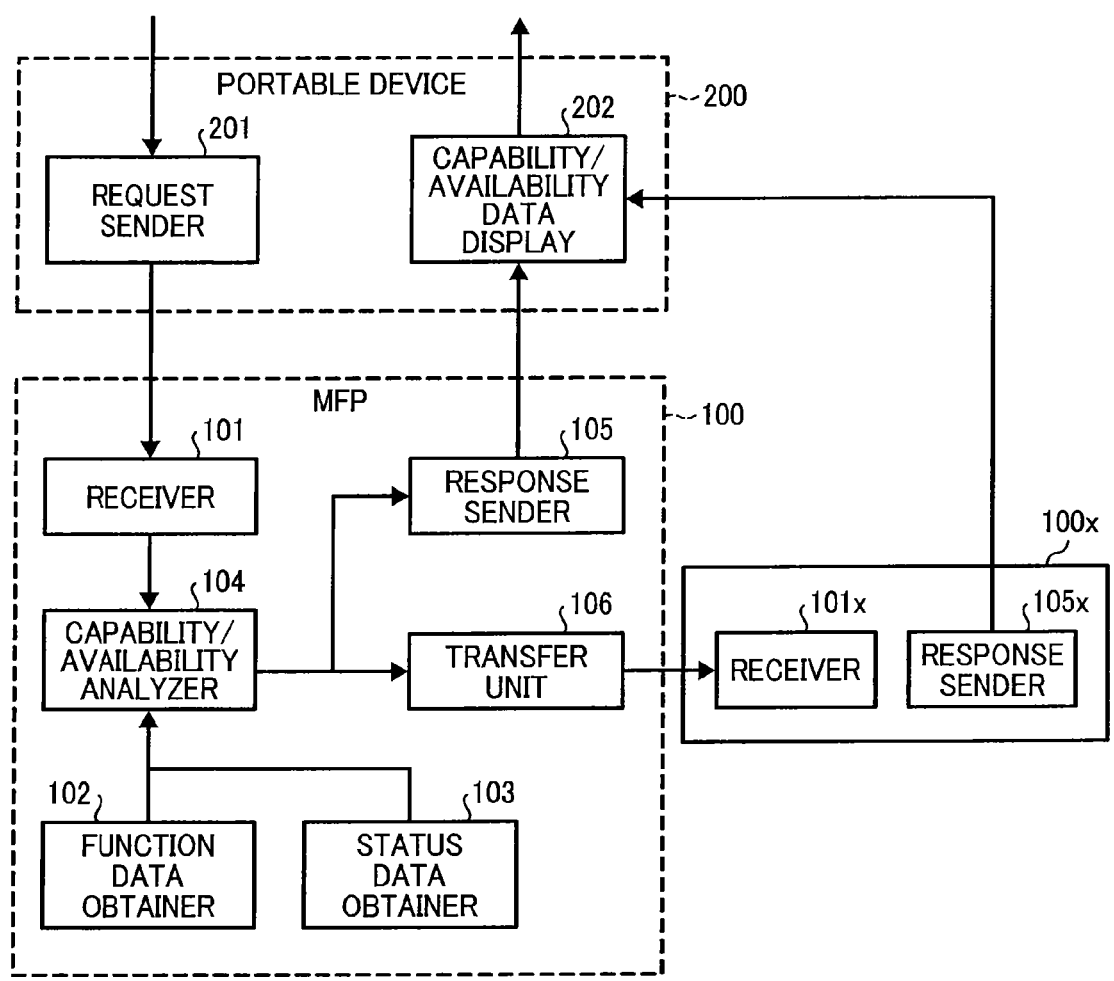
FIG. 3 is a schematic block diagram illustrating a selected portion of a functional structure of the image processing system of FIG. 1 according to an example embodiment of the present invention.

FIG. 3 illustrates a functional structure of the image processing system 1 of FIG. 1. More specifically, FIG. 3 illustrates a functional structure of a selected portion of the portable device 200, which relates to displaying information regarding the communicable MFPs 100. FIG. 3 further illustrates a functional structure of a selected portion of the MFP 100, which relates to sending information regarding capability or availability of the MFP 100 to perform the job to the portable device 200.

In this example, the CPU 213 loads a display control program from the ROM 214 to the RAM 215 to realize functional modules as illustrated in FIG. 3. Referring to FIG. 3, the portable device 200 includes a request sender 201 and a capability/availability data display 202.

The request sender 201 sends a request for information regarding the MFP 100 that is capable and available to perform a job, to the MFP 100 according to a user instruction input through the touch panel 211. The request sender 201 may be implemented by the network interface 210, which operates under control of the CPU 213, using application that generates a request. In one example, the request sender 201 receives a user instruction, which is input through a menu screen displayed on the touch panel 211 based on a hypertext document generated and sent by the web server 114 of the MFP 100. In such case, the request sender 201 generates a request using the web browser 212 and sends the request to the MFP 100. In another example, assuming that a job to be performed is a print job, the portable device 200 may be installed with a printer driver that generates and sends a request for information regarding the MFP 100 that is capable of performing a print job.

The capability/availability data display 202 displays information regarding one or more MFPs 100 that are capable of performing the job requested by the user instruction, and that are currently available to perform the job requested by the user instruction. The capability/availability data display 202 may be implemented by the touch panel 211, which operates under control of the CPU 213.

Still referring to FIG. 3, the MFP 100 includes a receiver 101, a capability/availability analyzer 104, a function data obtainer 102, a status data obtainer 103, a response sender 105, and a transfer unit 106.

The receiver 101, which may be implemented by the network interface 110 that operates under control of the CPU 119, receives a request from the outside apparatus such as the portable device 200. For example, the receiver 101 receives an execution check request, which requests the MFP 100 to determine whether the MFP 100 is capable of and available for performing a job to be requested by the portable device 200 based on settings information input by the user.

The function data obtainer 102 obtains information regarding a plurality of functions that can be performed by the MFP 100. For example, the function data obtainer 102 may obtain information indicating a type of image processing function that can be performed by the MFP 100, such as whether the MFP 100 is capable of performing the fax function, copy function, scan function, or print function. The function data obtainer 102 further obtains information indicating one or more items regarding settings, such as whether the MFP 100 is capable of printing in color, etc. The information regarding the functions of the MFP 100 may be used to determine whether the MFP 100 is capable of performing the job requested by the portable device 200. The function data obtainer 102 may be implemented by the instructions of the CPU 213.

The status data obtainer 103 obtains information regarding a current status of the MFP 100, such as whether the MFP 100 is currently available to perform the job to be requested by the portable device 200, or whether the MFP 100 has a sufficient supply to perform the job to be requested by the portable device 200.

The capability/availability analyzer 104 determines whether the MFP 100 is capable of and currently available for performing the job to be requested by the portable device 200, based on the information obtained by the function data obtainer 103 and the information obtained by the status data obtainer 103, as well as information received from the portable device 200. More specifically, the capability/availability analyzer 104 determines whether the MFP 100 is capable of performing the job to be requested by the portable device 200 based on the function information obtained by the function data obtainer 103 to generate a capability determination result. The capability/availability analyzer 104 further determines whether the MFP 100 is currently available to perform the job to be requested by the portable device 200, based on the status information obtained by the status data obtainer 103 to generate an availability determination result.

The transfer unit 106 transfers the execution check request received from the portable device 200 to the other MFP 100 that is a peripheral device of the MFP 100 transferring the request.

The response sender 105 sends a response including the capability determination result and the availability determination result to the portable device 200, in response to the execution check request.

In operation, the portable device 200 displays a menu screen on the touch panel 211, for example, when a request for performing a job is instructed. For example, in case the touch panel 211 receives a user instruction for performing a copy job, the touch panel 211 displays a menu screen of FIG. 5A. The menu screen of FIG. 5A includes a "check" key 301, "read settings" key 302A, and "print settings" key 302B.

The "read settings" key 302A, when selected by the user, allows the user to configure various settings regarding reading of an original document to be copied. The "print settings" key 302B, when selected by the user, allows the user to configure various settings regarding printing of an original document to be copied. The "check" key 301, when selected by the user, sends a request for information regarding one or more MFPs 100 that are capable of and currently available to perform the job to be requested by the user.

Figure 5A:
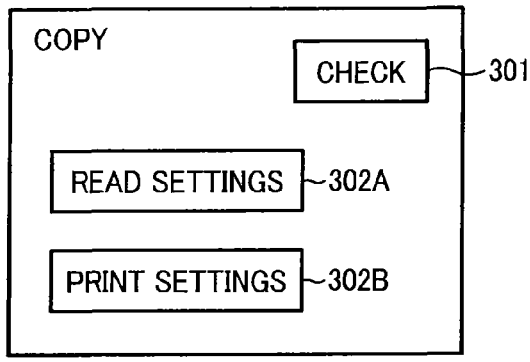
Figure 5B:
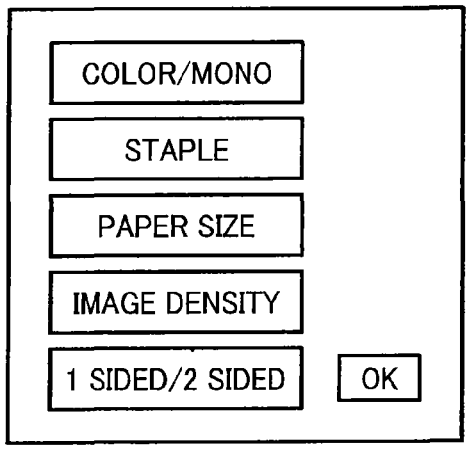

Assuming that the user selects the "print settings" key 302B, the touch panel 211 displays a print settings user interface, such as a print settings screen of FIG. 5B. The print settings screen of FIG. 5B allows the user to set various settings regarding printing, such as whether to print in color or monochrome (color/mono), whether to staple (staple), a paper size (paper size), an image density (image density), or whether to print in single-sided or double-sided (1 sided/2 sided). For example, the user may select a value to be set from a pull-down menu, or by touching at the key on the touch panel 211 to open a separate window that displays options. After entering the set values, the user may press the "OK" key of the screen of FIG. 5B to confirm the set values just entered. At this time, the portable device 200 stores settings information regarding the set values entered by the user in a memory. Further, in response to the "OK" key, the touch panel 211 switches back to the menu screen of FIG. 5A.

When the "check" key 301 is selected by the user, the portable device 100 starts operation of obtaining information regarding one or more MFPs 100 that are capable of executing printing according to the set values just entered and confirmed, which will be described below referring to FIG. 4A.

At S101, the request sender 201 of the portable device 200 firstly searches for one or more MFPs 100 that can be communicated with the portable device 200, such as one or more MFPs 100 that are provided on the LAN 300a. In this example, it is assumed that the MFPs 100a, 100b, and 100b are communicable with the portable device 200. The request sender 201 sends an execution check request with the settings information, to each one of the MFPs 100a to 100c. The execution check request, which may be generated in the form of a signal, requests the MFP 100 to send a response indicating whether processing to be instructed is currently executable by the MFP 100.

For simplicity, the following example illustrates the example case in which the MFP 100a performs operation in response to the execution check request received from the portable device 200. The MFP 100b and the MFP 100c each perform operation in a substantially similar manner, when the execution check request is received from the portable device 200.

The MFP 100a receives the execution check request at the receiver 101. At S102, the function data obtainer 102 of the MFP 100a obtains information regarding a plurality of functions that are available to the MFP 100a. As described above referring to FIGS. 1 and 2, the functions that can be performed by each MFP 100 may differ among the MFPs 100a to 100c, such that all of the MFPs 100a to 100c may not be able to perform the copy job according to the set values input by the user. In this example, in addition to obtaining information regarding whether the MFP 100a is provided with the copy function, the function data obtainer 102 obtains information regarding the set items that are available to the MFP 100a. For example, the function data obtainer 102 obtains information regarding whether the MFP 100a is capable of printing in color, whether the MFP 100a has a stapler, what type of paper the MFP 100a is provided with, whether the MFP 100a is provided with the function to adjust image density, and whether the MFP 100a is capable of printing a double-sided image. The obtained information regarding the functions of the MFP 100a is sent to the capability/availability analyzer 104.

At S103, the status data obtainer 103 of the MFP 100a obtains information regarding a current status of the MFP 100a. For example, the status information obtained by the status data obtainer 103 is used to determine whether the MFP 100a is currently available for performing the job to be requested by the portable device 200.

For example, the status data obtainer 103 obtains information indicating whether the MFP 100a is currently performing the other job according to a request received from the other portable device 200. When the MFP 100a is currently performing the other job, the status data obtainer 103 may further obtain information regarding completion of the other job, such as the estimated time at which the currently-performed job completes.

In another example, the status data obtainer 103 may obtain information indicating whether the MFP 100a has a sufficient supply to perform a job, such as whether ink or toner is available, or whether a recording sheet is available. In another example, the status data obtainer 103 may obtain information indicating whether the MFP 100a is experiencing an error or a trouble. The obtained status information is sent to the capability/availability analyzer 104.

In this example, S102 and S103 may be performed in any order. Alternatively, S102 and S103 may be performed in prior to S101, that is, before receiving the execution check request. In such case, the MFP 100a may periodically perform any one of S102 and S103 to obtain information regarding the functions of the MFP 100a and the current status of the MFP 100a. The obtained information regarding the function and/or the current status may be stored in a memory, at least temporarily, to be accessed by the capability/availability analyzer 104. However, in case the current status information is outdated, the status information indicating the current status of the MFP 100a may need to be obtained.

At S104, the capability/availability analyzer 104 determines whether the MFP 100a is capable of performing the job to be requested, and is currently available to perform the job to be requested, based on the settings information received with the execution check request, information regarding the functions of the MFP 100a obtained at the function data obtainer 102, and the status information of the MFP 100a obtained at the status data obtainer 103.

The capability/availability analyzer 104 determines whether the MFP 100a is capable of performing the job to be requested by the portable device 200, based on comparison between the obtained information regarding the functions of the MFP 100a and the settings information indicating the set values to generate a capability determination result. The capability determination result indicating whether the MFP 100a is capable of performing the job, may be stored in a memory, at least temporarily.

The capability/availability analyzer 104 further determines whether the MFP 100a is currently available to perform the job to be requested by the portable device 200, based on the status information. For example, when the status information indicates that the MFP 100a is currently performing the other job according to a request received from the other portable device 200, the capability/availability analyzer 104 determines that the MFP 100a is not currently available. In another example, when the status information indicates that the MFP 100a does not have a sufficient supply or experiencing an error or a trouble, the capability/availability analyzer 104 determines that the MFP 100a is not currently available to generate an availability determination result. The availability determination result indicating whether the MFP 100a is currently available to perform the job, may be stored in a memory, at least temporarily.

In one example, when the capability/availability analyzer 104 determines that the MFP 100a is not capable of performing the job to be requested according to the settings information, S105 is performed. At S105, the transfer unit 106 transfers the execution check request and the settings information, which are received from the portable device 200, to the other peripheral MFP 100x. The MFP 100x performs S101 to S104 as described above to generate a response including a capability determination result and an availability determination result, and sends the response to the MFP 100a in response to the execution check request. At S106, the response sender 105 sends a response including information regarding the MFP 100a, and information obtained from the peripheral MFP 100x, to the portable device 200. More specifically, in this example, the capability determination result of the MFP 100a indicates that the MFP 100a is not capable of performing the job to be requested. The capability determination result of the peripheral MFP 100 indicates that the peripheral MFP 100 is capable of performing the job to be requested.

In another example, when the capability/availability analyzer 104 determines that the MFP 100a is capable of performing the job to be requested according to the settings information, and is currently available to perform the job to be requested according to the settings information, at S106, the capability/availability analyzer 104 causes the response sender 105 to send a response including the capability determination result and the availability determination result, to the potable device 200. More specifically, the capability determination result indicates that the MFP 100 is capable of performing the job to be requested, and the availability determination result indicates that the MFP 100 is currently available to perform the job to be requested.

In another example, when the capability/availability analyzer 104 determines that the MFP 100a is capable of performing the job to be requested according to the settings information, but is not currently available to perform the job to be requested according to the settings information, at S106, the capability/availability analyzer 104 causes the response sender 105 to send a response including the capability determination result, the availability determination result, and information indicating the current status of the MFP 100, to the portable device 200. More specifically, the capability determination result indicates that the MFP 100 is capable of performing the job to be requested. The availability determination result indicates that the MFP 100 is not available to perform the job to be requested, and the information indicating the current status of the MFP 100 includes the estimated time at which the MFP 100 becomes available to perform the job.

As described above, the portable device 200 sends the execution check request to each one of a plurality of MFPs 100 (in this example, the MFPs 100a to 100c) communicable with the portable device 200. The portable device 200 thus receives a response in response to the execution check request, from each one of the plurality of MFPs 100.

Figure 5C:
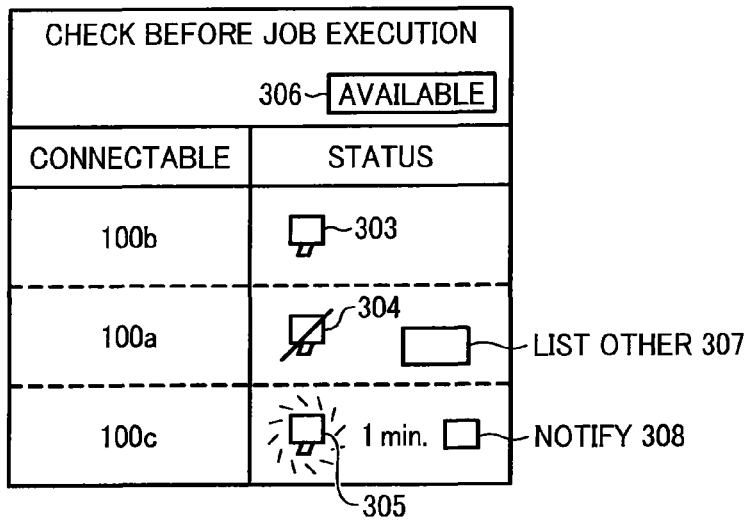

At S107, the capability/availability data display 202 of the portable device 200 combines the responses received from the MFPs 100a to 100c to generate information regarding the capability/availability of the MFPs 100, and displays a screen including the capability/availability information on the touch panel 211 as illustrated in FIG. 5C.

Figures 6, 7:
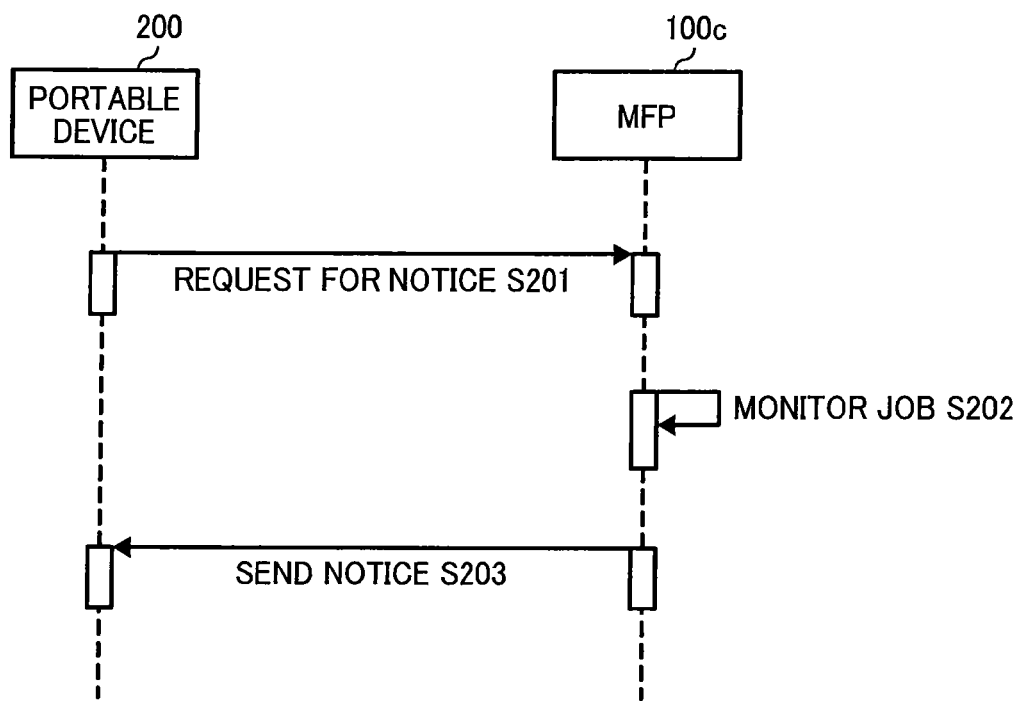
FIG. 6 is an example data structure of a capability/availability data management table, managed by the portable device of FIG. 1.
FIG. 7 is a data sequence diagram illustrating operation of requesting the image processing apparatus to notify when a job finishes, performed by the portable device of FIG. 1, which communicates with the image processing apparatus, according to an example embodiment of the present invention.

For example, the portable device 200 manages the capability/availability information using a table as illustrated in FIG. 6. Referring to FIG. 6, the capability/availability data table stores, for each one of the MFPs 100a to 100c communicable, identification information for identifying the MFP 100, the capability determination result indicating whether the MFP 100 is capable of performing the job to be requested, and the availability determination result indicating whether the MFP 100 is currently available to perform the job to be requested.

The capability/availability data table further stores additional information. For example, the capability/availability data table further includes information regarding the peripheral MFP 100, which is stored in association with the MFP 100 not capable of performing the job. The capability/available data table further includes information regarding the estimated time when the currently-performed job completes, for the MFP 100 not available to perform the job.

The capability/availability data table further stores information indicating the status of the MFP 100, indicating whether the MFP 100 is capable of and currently available for performing the job to be requested, which depends on the capability determination result and the availability determination result. In this example, the status "executable" indicates that the MFP 100b is currently capable of performing the job to be requested. The status "other MFP" indicates that the job to be requested can be performed by the other peripheral MFP 100, other than the MFP 100a. The status "executing" indicates that the MFP 100c is not currently available to perform the job to be requested. For each one of the MFPs 100a to 100c, a specific icon is assigned to each status based on the capability determination result and the availability determination result.

The capability/availability data display 202 displays the screen of FIG. 5C based on the capability/availability data table of FIG. 6. The screen of FIG. 5C lists the MFPs 100a to 100c that are communicable, in association with the icons 303 to 305. The icon 303 of the MFP 100b indicates that the MFP 100b is capable of performing the job to be requested and is currently available to perform the job to be requested. The icon 304 of the MFP 100a indicates that the MFP 100a is not capable of performing the job to be requested. The icon 305 of the MFP 100c indicates that the MFP 100c is capable of performing the job to be requested and is not currently available to perform the job to be requested. The icon 305 in FIG. 5C keeps blinking, until the currently-performed job finishes.

The screen of FIG. 5C further includes a "list other" key 307, which, when selected, causes the touch panel 211 to display information regarding the peripheral MFP 100 that is capable of performing the job to be requested. In this example, when the "list other" key 307 for the MFP 100a that is not capable of performing the job is selected, the touch panel 211 displays a screen of FIG. 5E. The screen of FIG. 5E lists the peripheral MFP 100b, which is capable of performing the job to be requested. The screen of FIG. 5E may be additionally displayed in the form of a pop-up window, or the screen of FIG. 5E is displayed after being switched from the screen of FIG. 5C.

The screen of FIG. 5C further includes information indicating the estimated time at which the currently-perform job finishes. In this example, for the MFP 100c that is currently performing the other job, "1 min." is displayed to indicate that the other job will be finished in one minute.

The screen of FIG. 5C further includes a switch key 306 displaying the text "available", which, when selected, causes the touch panel 212 to switch from the screen of FIG. 5C to a screen of FIG. 5D. The screen of FIG. 5D only lists one or more MFPs 100 that are capable of performing the job to be requested, and are currently available to perform the job to be requested. In this example, the screen of FIG. 5D only lists the MFP 100b that is currently capable of performing the job to be requested. When the switch key 306 displaying the text "connectable" 306 is selected, the touch panel 212 switches from the screen of FIG. 5D to FIG. 5C.

The screen of FIG. 5C further includes a "notify" key 308, which, when selected, causes the touch panel 212 to display a screen of FIG. 5F when the MFP 100c becomes available to perform the job to be requested. The screen of FIG. 5F may be additionally displayed in the form of a pop-up window, or the screen of FIG. 5F is displayed after being switched from the screen of FIG. 5C. For example, in response to selection of the "notify" key 308, the portable device 200 performs operation of FIG. 7 to send a request for notifying completion of the currently-performed job to the MFP 100c.

Referring now to FIG. 7, operation of displaying the screen of FIG. 5F that notifies the user of completion of the currently-performed job, is explained according to an example embodiment of the present invention. More specifically, operation of FIG. 7 is performed by the CPU 213 in response to the user selection of the "notify" key 308 through the touch panel 211.

At S201, the request sender 201, which may be implemented by the network interface 210 that operates under control of the CPU 213, sends a request for sending notification to the MFP 100c.

At S202, the MFP 100c receives the request for notice. The MFP 100c monitors processing being performed at the MFP 100c. When the currently-performed job completes, at S203, the MFP 100c sends the response indicating that the job is completed to the portable device 200.

Based on the notification received from the MFP 100c, the portable device 200 displays the screen of FIG. 5F to notify the user of completion of the job. With this notification, the user is able to instruct the MFP 100c to perform the job.

Any one of the screens of FIGS. 5C to 5E displays information regarding the capability and availability of the MFP 100, in the form of icons that are different in appearance. As long as the icons are displayed differently, the icons may be displayed in numeral other ways, for example, in different colors.

Alternatively, the icons 303 to 305 may be displayed in the form of text. For example, the icon 303 may be replaced by the text "executable" indicating that the MFP 100b is currently capable of performing the job to be requested. The icon 304 may be replaced by the text "other MFP" indicating that the job to be requested can be performed by the other peripheral MFP 100. The icon 305 may be replaced by the text "executing" indicating that the MFP 100c is not currently available to perform the job to be requested. When the currently-performed job completes, the text "executing" displayed for the MFP 100c is changed to the text "executable".

Moreover, the screen of FIG. 5C may display any other information regarding the MFP 100.

Figure 4B:
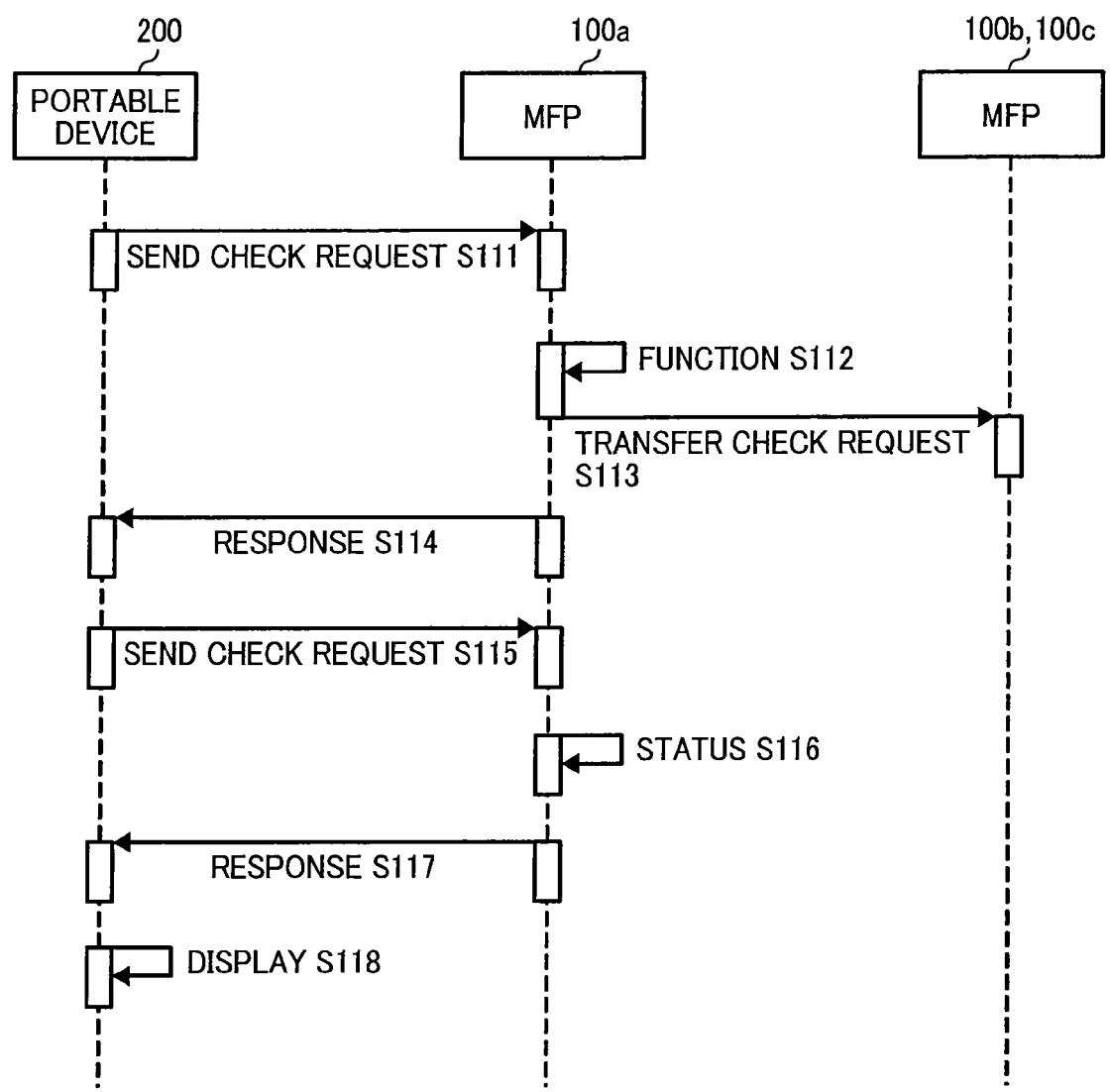
FIG. 4B is a data sequence diagram illustrating operation of displaying information regarding one or more image processing apparatuses, performed by the image processing system of FIG. 1, according to an example embodiment of the present invention.

The operation of FIG. 4A may be performed in various other ways. In the above-described example of FIG. 4A, in response to the execution check request, the MFP 100 sends a response including the capability determination result and the availability determination result to the portable device 200 at once. Alternatively, as illustrated in FIG. 4B, the portable device 200 and the MFP 100 may communicate with each other through a plurality of transactions.

Referring to FIG. 4B, at S111, the request sender 201 of the portable device 200 sends an execution check request to each one of the MFPs 100a to 100c, in a substantially similar manner as described above referring to S101 of FIG. 4A. In this example, the execution check request specifically requests the MFP 100 to send a capability determination result indicating whether the MFP 100 is capable of performing the job to be requested.

At S112, the function data obtainer 102 of the MFP 100a obtains information regarding a plurality of function that are available to the MFP 100a. The capability/availability analyzer 104 determines whether the MFP 100a is capable of performing a job to be requested, based on comparison between the functions of the MFP 100a and settings information, to generate a capability determination result.

When the capability determination result indicates that the MFP 100a is not capable of performing the job to be executed, S113 is performed. At S113, the MFP 100a transfers the execution check request to the peripheral MFP 100, and receives a response from the peripheral MFP 100.

At S114, the response sender 105 sends a response including the capability determination result to the portable device 200.

At S115, the request sender 201 of the portable device 200 sends an execution check request to each one of the MFPs 100 that has sent the capability determination result indicating that the MFP 100 is capable of performing the job to be requested, in a substantially similar manner as described above referring to S101 of FIG. 4A. In this example, the execution check request specifically requests the MFP 100 to send an availability determination result indicating whether the MFP 100 is currently available to perform the job to be requested.

At S116, the status data obtainer 103 of the MFP 100a obtains information regarding a current status of the MFP 100a. The capability/availability analyzer 104 determines whether the MFP 100a is currently available to perform a job to be requested, based on the status information, to generate an availability determination result.

At S117, the response sender 105 sends a response including the availability determination result to the portable device 200.

At S118, the capability/availability data display 202 of the portable device 200 combines the responses received from the MFPs 100a to 100c to generate information regarding the capability/availability of the MFPs 100, and displays a screen including the capability/availability information on the touch panel 211 as illustrated in FIG. 5C.

As described above, in the above-described example embodiment, the portable device 200 allows the user to perform operation of previously checking whether any one of the MFPs 100 is capable of performing the job to be executed, and is currently available to perform the job to be executed. In response to the user request, the portable device 200 sends the execution check request to each one of the MFPs 100 that is communicable with the portable device 200, receives the responses from the MFPs 100 each indicating the capability and the availability of the MFP 100, and displays information regarding the capability and the availability of the MFPs 100. With this information, the user is able to select the MFP 100 that is capable and available, and sends a job execution request to the selected MFP 100. Accordingly, in prior to sending the job execution request to the MFP 100, the user at the portable device 200 is able to previously check which one of the MFPs 100 that are communicable can perform the job to be requested and is currently available to perform the job to be requested. With this configuration, the portable device 200 is suppressed from sending the job execution request to the MFP 100 that is not capable of performing the job, or that is not available to perform the job, which may result in error.

Further, an execution check request and information regarding specific image processing settings may be sent together in the form of one request, or separately in the form of more than one request.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

Further, any of the above-described devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cashe memory of the CPU, and the RAM may function as a physical memory or a primary memory of the apparatus, while the HDD may function as a secondary memory of the apparatus.

What is claimed is:

1. An image processing system, comprising:
an operation device configured to send an execution check request and information regarding specific image processing settings, the execution check request requesting an image processing apparatus to determine whether the image processing apparatus is capable of executing and currently available to perform an image processing job according to the specific image processing settings; and
a plurality of image processing apparatuses each configured to communicate with the operation device via a network, each image processing apparatus including:
a network interface configured to receive the execution check request and the information regarding the specific image processing settings from the operation device; and
a processor configured to:
obtain function information indicating one or more functions of the image processing apparatus;
obtain status information indicating a current status of the image processing apparatus;
determine whether the image processing apparatus is capable of executing and currently available to perform the image processing job according to the specific image processing settings to generate a determination result, based on the function information, the status information, and the information regarding the specific image processing settings; and
send a response including the determination result, to the operation device in response to the execution check request, wherein
the operation device includes a display that displays one or more image processing apparatuses capable of executing and currently available to perform the image processing job according to the specific image processing settings, as a first apparatus, based on the responses respectively received from the plurality of image processing apparatuses configured to communicate with the operation device via the network,
the display of the operation device further displays
one or more image processing apparatuses capable of executing but not currently available to perform the image processing job to the specific image processing settings, as a second apparatus; and
one or more image processing apparatuses not capable of executing the image processing job according to the specific image processing settings, as a third apparatus, and
the first apparatus, the second apparatus, and the third apparatus are displayed in graphical images that are different from one another.

2. The image processing system of claim 1, wherein the determination result generated by each one of the plurality of image processing apparatuses includes:
a capability determination result indicating whether the image processing apparatus is capable of executing the image processing job according to the specific image processing settings, which is generated based on the function information and the information regarding the specific image processing settings; and
an availability determination result indicating whether the image processing apparatus is currently available to perform the image processing job according to the specific image processing settings, which is generated based on the status information and the information regarding the specific image processing settings,
wherein the display of the operation device displays the first apparatus, based on the capability determination result and the availability determination result.

3. The image processing system of claim 1, wherein the display of the operation device further displays a graphical image, which, when selected by a user, causes the display of the operation device to only display the first apparatus.

4. The image processing system of claim 1, wherein, when the processor of the image processing apparatus obtains the status information indicating that the image processing apparatus is currently performing a job other than the image processing job to be requested by the operation device,
the processor is further configured to obtain an estimated time required for completing the currently-performed job and sends the estimated time to the operation device in response to the execution check request, and
the display of the operation device additionally displays the estimated time in association with the second apparatus.

5. The image processing system of claim 4, wherein the operation device is further configured to:
send a notification request to the image processing apparatus currently performing the other job, which requests to send notification when the currently-performed job completes, and
display information indicating that the second apparatus is available to perform the image processing job, when the notification is received from the image processing apparatus in response to the notification request.

6. The image processing system of claim 5, wherein the display of the operation device further displays a graphical image, which, when selected by the user, causes the operation device to send the notification request to the image processing apparatus currently performing the other job, the graphical image being displayed in association with the second apparatus.

7. The image processing system of claim 1, wherein, when the processor of the image processing apparatus determines that the image processing apparatus is not provided with one or more functions to perform the image processing job according to the specific image processing settings, the processor is further configured to:
transfer the execution check request to one or more image processing apparatuses peripheral to the image processing apparatus; and
send peripheral apparatus information to the operation device in response to the execution check request, the peripheral apparatus information indicating whether any one of the one or more peripheral image processing apparatuses is capable of and currently available to perform the image processing job according to the specific image processing settings, based on responses respectively received from the one or more peripheral image processing apparatuses, and
the display of the operation device further displays the one or more peripheral image processing apparatuses capable of executing the image processing job, in association with the third apparatus.

8. The image processing system of claim 7, wherein the display of the operation device further displays a graphical image, which, when selected by the user, causes the operation device to display the one or more peripheral image processing apparatuses capable of executing the image processing job, the graphical image being displayed in association with the third apparatus.

9. A method of controlling a display of information regarding a plurality of image processing apparatuses through an operation device, the display control method comprising:
  receiving information indicating an image processing job to be executed according to specific image processing settings;
  sending an execution check request to each one of the plurality of image processing apparatuses configured to communicate with the operation device via a network, the execution check request requesting the image processing apparatus to determine whether the image processing apparatus is capable of executing and currently available to perform the image processing job according to the specific image processing settings;
  receiving a response from each one of the plurality of image processing apparatuses configured to communicate with the operation device via the network, the response including a determination result indicating whether the image processing apparatus is capable of executing and currently available to perform the image processing job according to the specific image processing settings, the determination result being generated based on function information of the image processing apparatus, status information of the image processing apparatus, and the information regarding the specific image processing settings;
  displaying, at a display of the operation device, one or more image processing apparatuses capable of executing and currently available to perform the image processing job according to the specific image processing settings, as a first apparatus, based on the responses respectively received from the plurality of image processing apparatuses configured to communicate with the operation device via the network;
  displaying one or more image processing apparatuses capable of executing but not currently available to perform the image processing job according to the specific image processing settings, as a second apparatus; and
  displaying one or more image processing apparatuses not capable of executing the image processing job according to the specific image processing settings, as a third apparatus, wherein
  the first apparatus, the second apparatus, and the third apparatus are displayed in graphical images that are different from one another.

10. The display control method of claim 9, further comprising:
  displaying a graphical image, which, when selected by a user, causes the display of the operation device to only display the first apparatus.

11. The display control method of claim 9, further comprising:
  receiving information indicating an estimated time required for completing a currently-performed job, from the image processing apparatus that obtains the status information indicating that the image processing apparatus is currently performing the currently-performed job other than the image processing job to be requested by the operation device; and
  displaying the estimated time in association with the second apparatus.

12. The display control method of claim 9, further comprising:
  sending a notification request to the image processing apparatus currently performing the other job, which requests to send notification when the currently-performed job completes, and
  displaying information indicating that the second apparatus is available to perform the image processing job, when the notification is received from the image processing apparatus in response to the notification request.

13. The display control method of claim 12, further comprising:
  displaying a graphical image, which, when selected by the user, causes the operation device to send the notification request to the image processing apparatus currently performing the other job, the graphical image being displayed in association with the second apparatus.

14. The display control method of claim 9, further comprising:
  receiving peripheral apparatus information indicating whether any one of one or more peripheral image processing apparatuses that are peripheral to the image processing apparatus is capable of and currently available to perform the image processing job according to the specific image processing settings; and
  displaying one or more peripheral image processing apparatuses capable of executing the image processing job, in association with the third apparatus.

15. The display control method of claim 14, further comprising:
  displaying a graphical image, which, when selected by the user, causes the operation device to display the one or more peripheral image processing apparatuses capable of executing the image processing job, the graphical image being displayed in association with the third apparatus.

* * * * *